United States Patent
Kapshandy et al.

(10) Patent No.: US 7,464,985 B2
(45) Date of Patent: Dec. 16, 2008

(54) WATER MANAGEMENT SYSTEM FOR VEHICLE CONVERTIBLE TOP

(75) Inventors: Michael Kapshandy, Adrian, MI (US); G. Joseph Frank, Deerfield, MI (US); Michael E. Kilpinen, Rochester Hills, MI (US)

(73) Assignee: Magna Cartop Systems GmbH, Bietighgim-Bissingen (DE)

( * ) Notice: Subject to any disclaimer, the term of this patent is extended or adjusted under 35 U.S.C. 154(b) by 10 days.

(21) Appl. No.: 11/612,280

(22) Filed: Dec. 18, 2006

(65) Prior Publication Data

US 2007/0145784 A1 Jun. 28, 2007

Related U.S. Application Data

(60) Provisional application No. 60/750,891, filed on Dec. 16, 2005.

(51) Int. Cl.
*B62D 25/13* (2006.01)

(52) U.S. Cl. ...................... 296/208; 296/213

(58) Field of Classification Search ............. 296/208, 296/213
See application file for complete search history.

(56) References Cited

U.S. PATENT DOCUMENTS

| | | | | |
|---|---|---|---|---|
| 3,096,117 A | * | 7/1963 | Hallenbeck | 296/107.07 |
| 3,630,568 A | * | 12/1971 | Podwys | 296/116 |
| 4,332,415 A | * | 6/1982 | Williams | 296/213 |
| 4,892,351 A | * | 1/1990 | Ono et al. | 296/213 |
| 5,527,081 A | * | 6/1996 | Rausch et al. | 296/39.1 |
| 6,010,179 A | * | 1/2000 | McGoldrick | 296/124 |
| 6,145,909 A | * | 11/2000 | Staley et al. | 296/39.1 |
| 6,323,144 B1 | * | 11/2001 | Dalbec | 442/120 |
| 6,641,202 B2 | * | 11/2003 | Graf et al. | 296/107.04 |

* cited by examiner

*Primary Examiner*—Dennis H. Pedder
*Assistant Examiner*—Mike Hernandez
(74) *Attorney, Agent, or Firm*—Brinks Hofer Gilson & Lione

(57) ABSTRACT

A water management system for convertible tops for motor vehicles is provided. The system attaches to a rear edge of the folding top, generally below the rear window and collects water which runs or sheets rearwardly off the surface of the top to direct the water to drainage tubes and expel the water from the vehicle.

17 Claims, 2 Drawing Sheets

US 7,464,985 B2

WATER MANAGEMENT SYSTEM FOR VEHICLE CONVERTIBLE TOP

CROSS REFERENCE TO RELATED APPLICATIONS

The present application claims the benefit of the filing date of U.S. Provisional Application Ser. No. 60/750,891, filed Dec. 16, 2005, the teachings of which are incorporated herein by reference.

FIELD OF INVENTION

This invention relates to vehicles having a convertible top that can be raised over a passenger space or retracted into a storage space near the rear of the vehicle. More specifically, the invention relates to a water management system which is an integral part of the folding top.

BACKGROUND OF THE INVENTION

Sealing of a convertible top to prevent water leakage inside the vehicle has been approached in numerous ways. Flexible strips and molded sections may be used between the longitudinal rails and adjacent windows. Gasketing is often used along the windshield header. At the rear of the convertible top, a tray or drainage trough may be used to collect water in the bootwell and provide a path for expelling the water. A stamped sheet metal drain trough is commonly welded to an upper portion of the bootwell. The conventional drain trough acts to receive water rearwardly running off the convertible top. Separate, flexible drain hoses may be connected to outboard ends of the drain trough to expel the water. This tray or trough may be integrated into the boot well, be formed of plastic and even carpeted. However, such a device is usually a separate component or sub-assembly that requires installation into a rearmost section of the vehicle body or boot well.

Recently, convertible tops have been developed which interface with a tonneau cover that hinges opens to allow the folded top to be stored beneath it.

Also, trunk or rear deck lids have recently been designed which may hinge about a rearmost point to allow the folded top to be retracted into a forward or upper portion of the trunk area when the deck lid is open, facing forward. In addition, the lid may also be hinged around a forward point to allow normal trunk lid functioning and luggage storage.

These newer designs present challenges to the collection of water that may run, or sheet off the surface of a convertible top. Since the front edge of the deck lid is moveable, sealing is more complicated and a system is required to collect and direct the water and not allow the trunk or luggage storage area of the vehicle to get wet. Preferably, the water management system may be installed as part of the convertible top, saving assembly time and installation costs at the vehicle assembly plant.

The present invention is directed at a water management system for a convertible top which may be attached to the top and which may collect water flowing from the top and direct the water to drainage points within the body of the vehicle.

It is, therefore, an object of the present invention to provide a water management system for a convertible, by which water which runs off the convertible top is directed to drains and expelled from the vehicle.

SUMMARY OF THE INVENTION

The present invention is directed at a water management system for a convertible top wherein the system comprises a flexible water directing member (WDM) configured preferably in a W-shape in plan view with a drainage nozzle at each of the two lower extremities of the "W". The drainage nozzles may engage drainage holes near the trunk area of the vehicle to expel any water collected. The flexible water directing member is further configured in a U-shape in vertical cross-section such that one leg of the "U" may be attached to the rear edge of the convertible top. The open end of the "U" is thus available to collect and direct water rolling off the convertible roof. In a preferred embodiment, the upward legs of the "U" may be connected along their length at spaced intervals by strips of hook and loop fasteners or the like, thus providing areas where water sheeting off the top may be collected and funneled away.

BRIEF DESCRIPTION OF THE DRAWINGS

These and other objects, features and advantages of the present inventions will become apparent to those skilled in the art upon reference to the following written description and accompanying drawings in which.

DETAILED DESCRIPTION OF THE INVENTION

The present invention is described more fully hereinafter with reference to the accompanying drawings, in which preferred embodiments of the invention are shown. This invention, may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
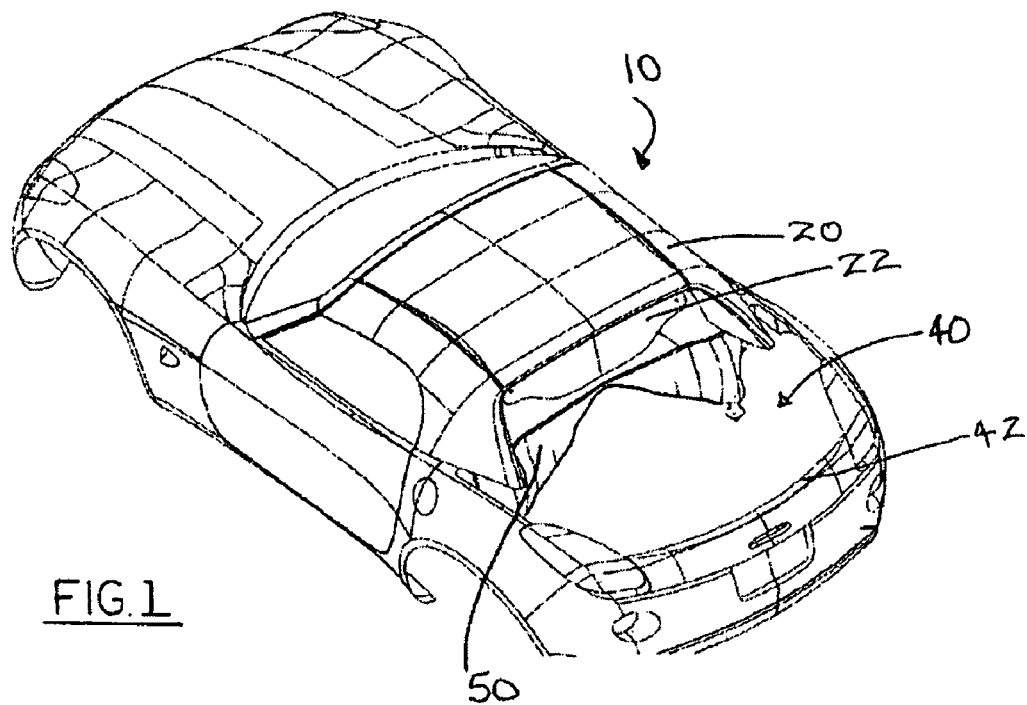
FIG. 1 is a perspective view of the water management system of the present invention installed in a convertible vehicle, with the trunk lid of the vehicle removed for clarity.

FIG. 1 is a perspective view of a sports car 10 which includes a convertible top 20. In a preferred embodiment the top 20 may comprise a fabric covered folding mechanism which includes a series of tensioning bows extending laterally, as is well known to those skilled in the art. The top 20 further may include a rear window 22 placed at the center near the rearmost edge of the folding top. The top 20 may reside in a first extended position covering the passenger space of the vehicle 10 or in an alternate position (not shown) the top may be folded and retracted to reside in the trunk area 40 of the vehicle 10. FIG. 1 illustrates a sports car 10 with the trunk, or rear deck lid, removed for clarity. The lid may hinge around a rearmost point 42 so that the lid opens in a forward facing (in car) manner to allow the convertible top to fold rearwardly and be stored in the trunk area 40. Following storage, the rear deck lid may close to seal off the trunk area and provide a pleasing body line.

FIG. 1 further illustrates the water management system which comprises the present invention. A preferably "W" shaped open-ended water directing member (WDM) 50 is shown attached to the rear edge of the convertible top 20 below the rear window 22 to catch and funnel away any water which sheets or runs off the back of the convertible top.

Figure 2:
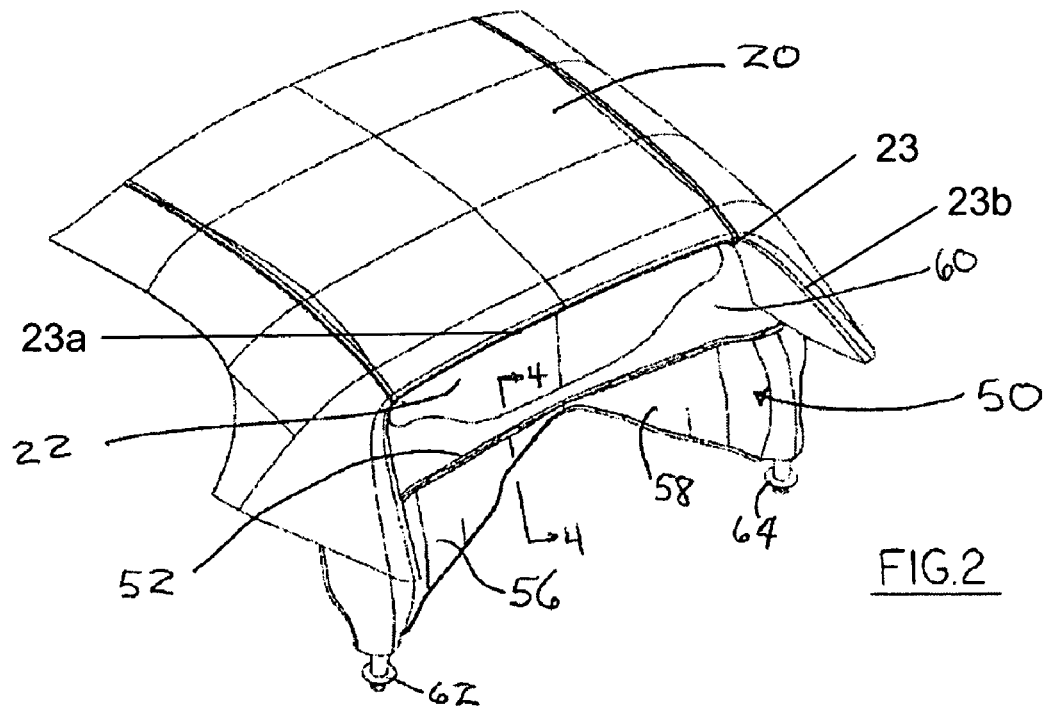
FIG. 2 is a perspective view of the convertible top of FIG. 1 showing additional details regarding the present invention.

FIG. 2 is a perspective view of the convertible top 20 illustrating the WDM 50 mounted in position with said top having a pair of spaced articulated side linkages (23) interconnected by a plurality of spaced transversely extending bows (23A) supporting a top cover, each said linkage (23)

including a rear rail (23b) pivoted to the body. The WDM 50 may preferably comprise a plastic coated fabric similar in construction and appearance to the material which comprises the outer surface of the convertible top 20. The WDM 50 may be of any flexible construction capable of holding water, including but not limited to, coated fabric, leather and plastic.

In one preferred embodiment, the WDM 50 may comprise a vinyl coated polyester fabric which has been waterproofed and treated to prevent mildew. The WDM 50 may be preferably sewn along an upper edge 52 to attach the WDM 50 to the lower edge of the convertible top 20 and to make it appear as an integral part of the top. A particular advantage of this invention then is that the WDM 50 may be manufactured as part of the folding top 20 and provided for assembly to the vehicle already installed, saving time and labor in the vehicle assembly process. Other means of attachment may include, but are not limited to, adhesive, hook and loop fasteners, stapling and riveting.

As further shown in FIG. 2, the WDM 50 may preferably include two leg sections 56 and 58 which may extend downward and may terminate in a pair of drain tubes 62, 64 for directing any water collected in the bag away from the trunk area 40 and out of the vehicle 10. The drain tubes may engage with holes (not shown) in the floor of the vehicle 10 to expel any water outside of the vehicle 10.

Figure 3:
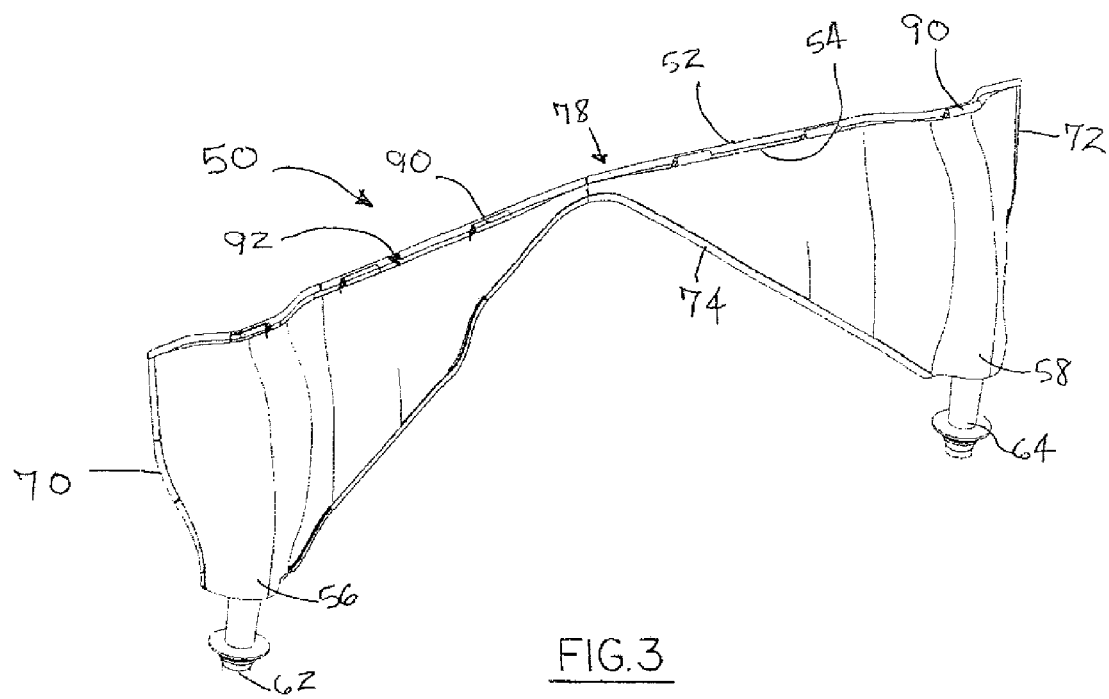
FIG. 3 is a perspective view of the water management system of the present invention.

FIG. 3 is a perspective view of the water management WDM 50 of the present invention. Much like a pair of pants, the WDM 50 may be preferably sewn together along the sides 70, 72 and lower 74 edges to contain any water and direct such to the drain tubes mounted in the lower extremities or leg section 56 and 58. The top 78 of the WDM 50 may comprise front 52 and rear 54 upper edges (similar to a beltline) which preferably are not sealed together so that they may allow water running or sheeting off the convertible top 20 in the area of the rear window 22 to be collected and expelled. At a plurality of locations intermittent along the top 78 or beltline, narrow strips of Velcro® or similar hook and loop fasteners 90 may be attached to form a series of openings 92 therebetween along the top edge 78 for water to enter. In addition, an open-celled foam block may be inserted as a spacer (not shown) near the lower portions of the WDM to keep the sides (legs of the "U") separated somewhat.

Figure 4:
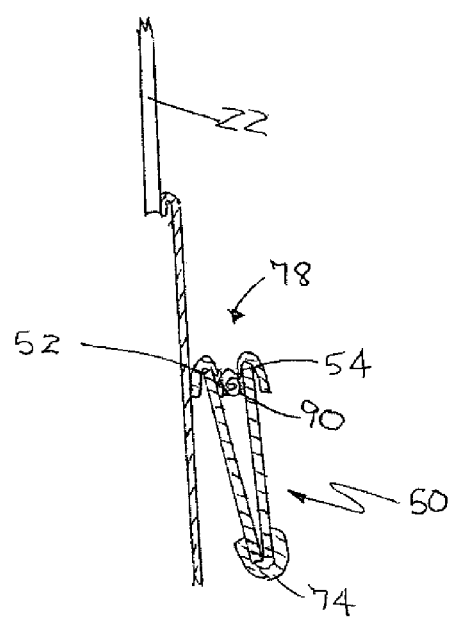
FIG. 4 is a cross-sectional view of FIG. 2 taken along lines 4-4.

FIG. 4 is a cross-sectional view of the water management system shown in FIG. 3, taken along lines 4-4. The WDM 50 may preferably comprise a U-shaped configuration in cross-section with the top 78 of the "U" comprising a front upper edge 52 and a rear upper edge 54 which may be joined at spaced intervals across car by hook and loop type fasteners 90. Preferably, the hook portion of the fastening system 90 is attached to the front edge 52 and the loop portion is rolled into a spiral and attached to the rear edge 54 to provide a series of spaced apart openings 92 at the top edge 78 of the WDM 50. Alternate attachment means may also be used to temporarily secure the upper edges of the "U", preferably of a recloseable nature such that the WDM may be easily opened form the top 78 to remove any accumulated debris (leaves, pine needles, bugs, etc.). As shown in FIG. 4, the WDM 50 may have its edges 52, 54 and 74 bound or heat sealed to contain water and direct the water to drain tubes connected to holes in the body of the vehicle. The WDM 50 may be attached at its front edge 52 to a backlight curtain 60 which lies below the backlight 22. Preferably, attachment to a folding top is by sewing so that an appearance that is compatible with the overall theme and design of the top is obtained. Other means for attaching the WDM to a folding or hard top have been described herein above.

The water management system thus provided, may allow water which may run off the folding convertible top to be collected and expelled from the vehicle. The system further may be integrated into the convertible top to provide a seamless and flexible system that may be stored with the folded top. While the preferred configuration as disclosed herein is in the shape of a "W" in plan view with two downstanding legs and drainage tubes, the invention contemplates any shape having at least one opening at the top end for receiving water and one or more downstanding portions for directing the water to an area where it may be expelled from the vehicle.

Further, it is contemplated that the present invention may be used with convertible hard tops as well as folding soft tops to collect water and expel such from a vehicle and be likewise integrated into the rear edge of the top. The present invention may further be integrated with tops which engage with various tonneau covers or boots which close out the area in which the top is stored when in a retracted position.

The description and drawings illustratively set forth the presently preferred invention embodiment. We intend the description and drawings to describe this embodiment and not to limit the scope of the invention. Obviously, it is possible to modify these embodiments while remaining within the scope of the following claims. Therefore, within the scope of the claims one may practice the invention otherwise than as the description and drawings specifically show and describe.

What is claimed is:

1. A water management system for a convertible top of a vehicle, the convertible top including a rear edge which extends at least partway across the vehicle, the system comprising a water directing member having an opening at the top and one or more drainage tubes located at one or more lower extremities of the member wherein said opening is defined by a front edge and a rear edge of the water directing member and wherein the front edge of said water directing member is attached to said rear edge of said convertible top and the rear edge of said water directing member is directly attached to the front edge of the water directing member and supported thereby.

2. The water management system of claim 1, wherein said directing member comprises plastic coated fabric.

3. The water management system of claim 2, wherein the plastic comprises a polyvinyl chloride polymer and the fabric comprises polyester.

4. The water management system of claim 1, wherein said drainage tubes engage drainage holes in said vehicle.

5. The water management system of claim 1, wherein said water directing member includes side edges that are attached together to give the water directing member a generally "W" shape as seen in plain view and the lower portions of the "W" comprise the lower extremities.

6. The water management system of claim 1, wherein said front edge and rear edge of said water directing member are attached by the engagement of hook or loop fasteners, at attachment points that are located at spaced intervals, thereby, forming a plurality of smaller openings.

7. A convertible top for a vehicle that has a body including a storage well, said top being movable between a raised position and a folded position stored within the well, and a rear deck lid mounted for movement between a closed position, covering the well in top raised and lowered positions, and an open position enabling the top to be raised and lowered, said top having a pair of spaced articulated side linkages interconnected by a plurality of spaced transversely extending bows supporting a top cover, each said linkage including a rear rail pivoted to the body, said top cover including a rear window and a rear edge wherein a water management system is attached to the said rear edge, wherein said water management system comprises a water directing member having a plurality of openings at the top and one or more drainage tubes located at one or more lower extremities of the member and wherein said openings are defined by a front upper edge and a rear upper edge, wherein the front upper edge of said water directing member is directly attached to said rear edge of said top.

8. The water management system of claim 7, wherein said water directing member comprises plastic coated fabric.

9. The water management system of claim 8, wherein the plastic comprises a polyvinyl chloride polymer and the fabric comprises polyester.

10. The water management system of claim 7, wherein said drainage tubes engage drainage holes in said vehicle.

11. The water management system of claim 7, wherein said water directing member comprises generally a "W" shape as seen in plain view and the lower portions of the "W" comprise the lower extremities.

12. The water management system of claim 7, wherein said plurality of openings in said water directing member are formed by attaching the rear upper edge of the water directing member to the top upper edge by sewing or by the engagement of hook or loop fasteners, the hook fasteners and loop fasteners each located at spaced intervals, facing each other along said front edge and said rear edge of said openings.

13. The water management system of claim 12, wherein the rear upper edge of the water directing member is not attached to the rear deck lid of the vehicle.

14. A water management system for a convertible top of a vehicle, the convertible top including a rear edge which extends at least partway across the vehicle, the system comprising:
    a water directing member having a an opening at the top and one or more drainage tubes located at one or more lower extremities of the water directing member;
    a front upper edge and a rear upper edge of the water directing member defining the opening; and
    wherein the front upper edge of said opening is sewn along its length to said rear edge of said convertible top and wherein the rear edge of said water directing member is directly attached to the front edge of the water directing member.

15. The water management system of claim 14, wherein said opening in said water directing member is divided into a series of spaced apart smaller openings.

16. The water management system of claim 14, wherein the front upper edge is attached to the rear facing side of the rear edge of the convertible top.

17. The water management system of claim 14, wherein said water directing member is sewn to the convertible top and provided together for assembly to the vehicle.

* * * * *